July 18, 1944.   E. J. BEAULIEU ET AL   2,353,638
CONVEYER SYSTEM
Filed April 10, 1942    2 Sheets-Sheet 2
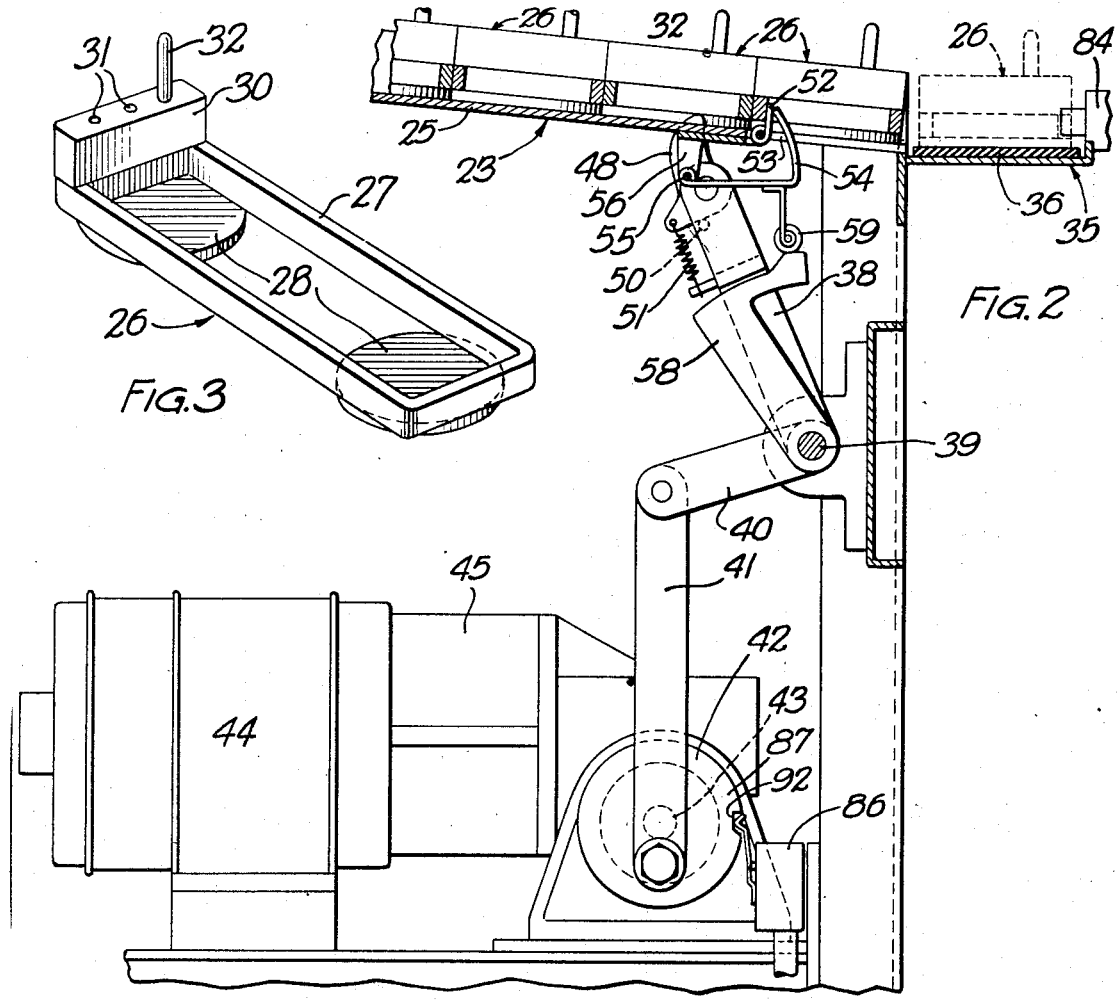
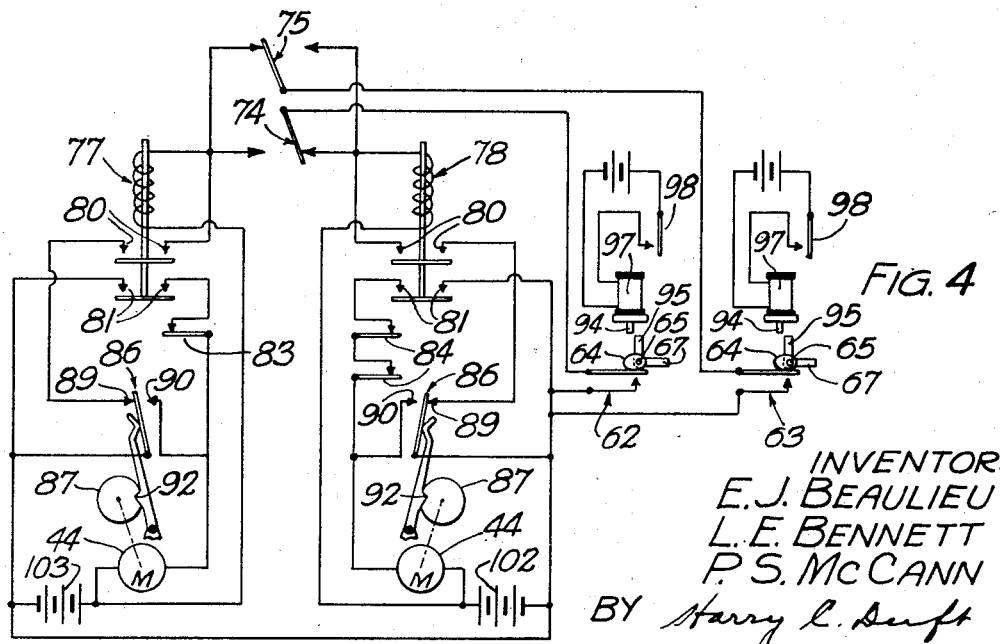
INVENTORS
E. J. BEAULIEU
L. E. BENNETT
P. S. McCANN
BY Harry L. Swift
ATTORNEY Patented July 18, 1944

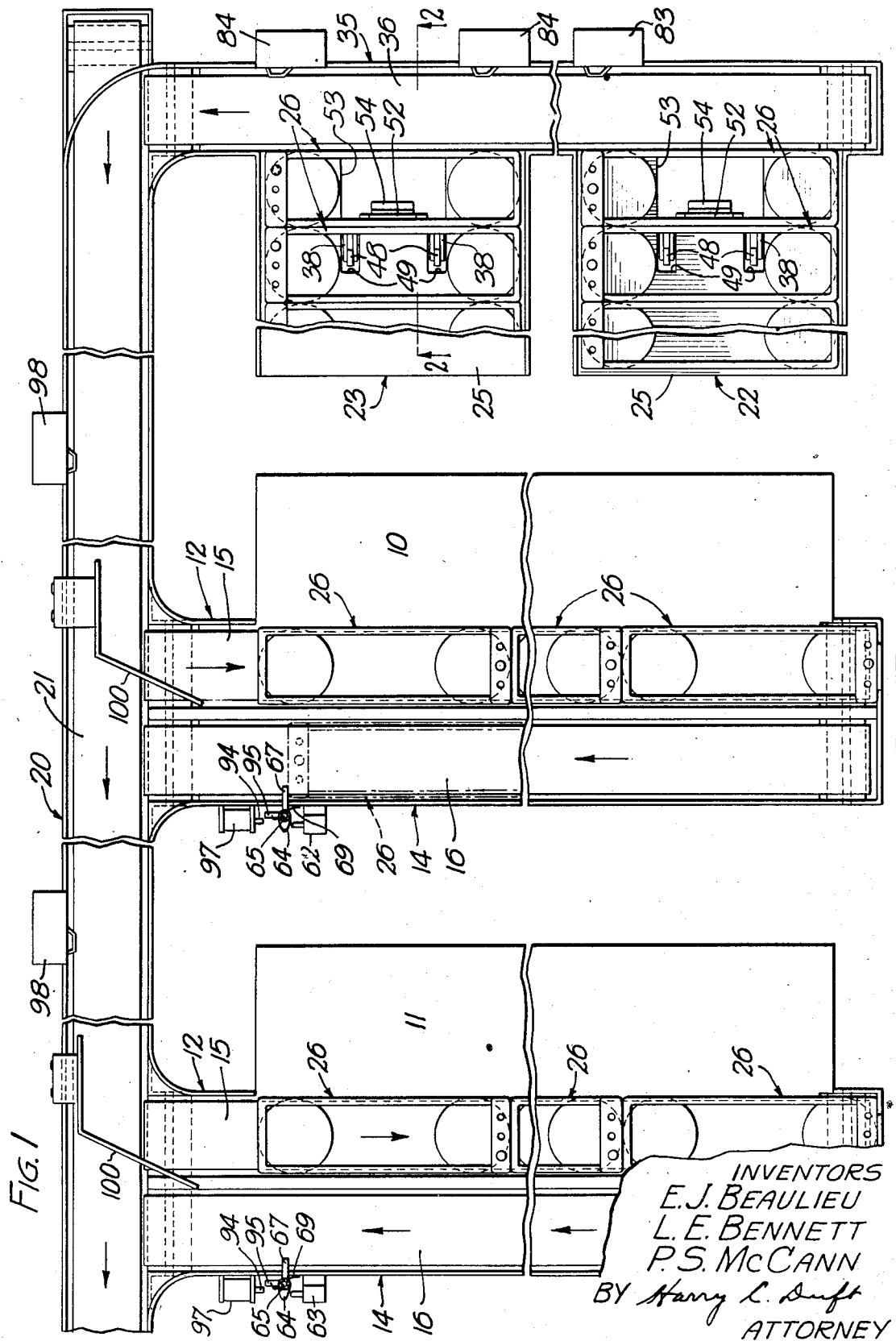

2,353,638

UNITED STATES PATENT OFFICE 2,353,638

CONVEYER SYSTEM

Ezra J. Beaulieu, Downers Grove, Loren E. Bennett, Hinsdale, and Paul S. McCann, La Grange, Ill., assignors to Western Electric Company, Incorporated, New York, N. Y., a corporation of New York Application April 10, 1942, Serial No. 438,452

10 Claims. (Cl. 198—19)

This invention relates to conveyer systems, and more particularly to a conveyer system for conveying articles to and from a series of work stations.

Objects of the invention are to provide a simple and efficient conveyer system for conveying articles to and from a plurality of stations and for constantly maintaining a constant supply of articles at each station.

In accordance with the above objects, one embodiment of the invention contemplates the provision of a conveyer system for conveying work to and from a plurality of work stations, in which a work carrier leaving any one of the work stations actuates a pre-selected one of a series of storage units for releasing another work carrier therefrom for delivery to the said work station.

Other features and advantages of the invention will become apparent from the following detailed description when read in conjunction with the accompanying drawings, in which:

Fig. 1 is a fragmentary plan view of a conveyer system embodying the invention;

Fig. 2 is an enlarged vertical sectional view taken on line 2—2 of Fig. 1;

Fig. 3 is a perspective view of one of the work carriers; and

Fig. 4 is a wiring diagram of the electrical control system.

The conveyer system illustrated in the drawings is adapted to carry articles or work pieces to and from a series of work tables or benches, only two of which are shown, which are designated in Fig. 1 by the reference numerals 10 and 11, respectively. Arranged side by side along each of the work tables are a work receiving conveyer 12 and a work discharging conveyer 14. These conveyers may be of any well known type, those illustrated being of the endless belt type. Each of the work receiving conveyers comprises an endless belt 15 and each of the work discharging conveyers comprises an endless belt 16. These conveyer belts are driven continuously along suitable guide channels by suitable means (none shown) in the directions indicated by the arrows. (Fig. 1.)

The work receiving conveyers are arranged to receive the articles or work pieces from a main conveyer 20, and the work discharging conveyers are adapted to convey the completed work back to the main conveyer. This main conveyer may be of any well known type. The one illustrated in the drawings comprises an endless belt 21 which is driven continuously along a suitable guide channel by suitable means (none shown) in the direction indicated by the arrows (Fig. 1).

Arranged adjacent the starting end of the main conveyer 20 are a series of work storage units, two of which are shown in the drawings and are designated generally in Fig. 1 by the reference numerals 22 and 23, respectively. These storage units may be of any suitable construction, those illustrated being of the gravity chute type, each comprising a gravity chute 25 of channel cross section adapted to accommodate a series of work supporting carriers 26, 26. As best shown in Fig. 3, each of the work supporting carriers comprises a rectangular hollow frame 27 which is provided at each end with a circular heel plate 28. An upstanding block 30 is attached to the forward end of the carrier and a series of holes 31, 31 is provided in this block for selectively receiving a pilot pin 32 for controlling the destination of the carrier in the manner hereinafter described.

The work pieces (none shown) are placed on the carriers 26 and the latter are placed in the storage chutes 25 from which they are transferred, one at a time, onto a transfer conveyer 35. This transfer conveyer may be of any well known type, the one illustrated in the drawings comprising an endless belt 36 which is driven continuously along a suitable guide channel by suitable means (none shown) in the direction indicated by the arrows (Fig. 1). The transfer conveyer is arranged to deliver the work carriers to the main conveyer 20.

Each of the storage units is equipped with a transfer mechanism for transferring the work carriers, one at a time, from the storage units onto the transfer conveyer. Each transfer mechanism comprises a pair of spaced transfer arms 38, 38 which are attached to and extend upwardly from a horizontal shaft 39 (Fig. 2). This shaft is operatively connected by links 40 and 41 to a crank wheel 42 on a crank shaft 43 which is driven by an electric motor 44 through a conventional speed reducer 45. The construction is such that the transfer arms are oscillated by the rotation of crank wheel 42. Each revolution of the crank wheel completes one cycle of operation of the transfer arms.

Pivoted to the upper end of each transfer arm is a finger 48 which extends upwardly through a slot 49 in the floor of the storage chute and is adapted to engage the work carriers and push them onto the transfer conveyer when the transfer arms are oscillated. A pin or projection 50 on the upper end of each transfer arm serves as a stop for limiting counter-clockwise movement (Fig. 2) of the associated finger 48 and a spring 51 normally holds the finger against the stop. Thus, during the forward movements of the transfer arms, the fingers are rigid with the arms, and during the return movement of the arms, the fingers are free to turn in a clockwise direction about their pivots in order to pass under the next carrier on the storage chute.

Stop mechanism is provided at the discharge end of each storage chute for normally preventing the carriers from sliding off of the chutes. In the illustrated embodiment of the invention, this stop mechanism comprises a pivoted plate 52 which is adapted to extend upwardly through a slot 53 in the floor of the storage chute and engage the rear frame bar of the first work carrier, as shown in Fig. 2. A cam operated latch 54 normally holds the stop plate in its operative position. This latch is pivoted at 55 to a bracket 56 attached to the under side of the storage chute, and is operated by a cam 58 fixed to the shaft 39. The cam engages a roller 59 carried by the latch and is designed to hold the latch in its operative position when the transfer arms are in their retracted positions. The cam is further designed to permit retraction of the latch by gravity to release the stop plate 52 at the beginning of each forward movement of the transfer arms.

In accordance with an important feature of the present invention, mechanism is provided whereby an outgoing work carrier, upon leaving any one of the work tables by way of the associated work discharging conveyer 14, causes the operation of the transfer mechanism at a pre-selected one of the storage units for releasing another work carrier therefrom to replace the outgoing work carrier, so that a constant number of work carriers is constantly maintained at each work table. Thus, in the illustrated embodiment of the invention, the transfer mechanisms at the two storage units are controlled by two normally open switches 62 and 63 which are mounted near the discharge ends of the work discharging conveyers of work tables 10 and 11, respectively, and are adapted to be closed by outgoing carriers. Each of the switches 62 and 63 is arranged to be closed by a cam 64 on a vertical rock shaft 65. Attached to this rock shaft is an arm 67 which extends transversely over the associated work discharging conveyer and in the path of outgoing work carriers, so that the forward end of each outgoing carrier engages the arm 67 and thereby turns the shaft 65 in a counter-clockwise direction (Fig. 1), against the opposing force of a restoring spring 69, thus causing cam 64 to close switch 62.

The closing of either switch 62 or switch 63 causes the operation of the transfer mechanism at a pre-selected one of the storage units. The pre-selection of the storage units is accomplished by the use of selector switches 74 and 75 (Fig. 4). By means of selector switch 74, a pre-selected one of the transfer mechanisms may be actuated by the closing of switch 62 at work table 10, and by means of selector switch 75, a pre-selected one of the transfer mechanisms may be actuated by the closing of switch 63 at work table 11.

A relay 77 controls the transfer mechanism of storage unit 22, and a similar relay 78 controls the transfer mechanism of storage unit 23. As shown in Fig. 4, the energizing circuits for these relays include the selector switches 74 and 75 as well as the outgoing carrier operated switches 62 and 63. Each of the relays is equipped with a set of normally open holding contacts 80, 80 and a set of normally open transfer motor controlling contacts 81, 81. The contacts 81 of relay 77 control the starting circuit of transfer motor 44 of storage unit 22, and the contacts 81 of relay 78 control the starting circuit of the transfer motor of storage unit 23. A normally closed anti-colliding switch 83 is included in the starting circuit of the transfer motor of storage unit 22 and two normally closed anti-colliding switches 84, 84 are included in the starting circuit of the transfer motor of storage unit 23. These anti-colliding switches are mounted adjacent the transfer conveyer belt 36, and are adapted to be opened by work carriers moving along the transfer conveyer belt, so that the transfer motors will not be operated when there are work carriers on the transfer conveyer with which carriers from the storage units would collide if transferred therefrom at that time.

Included in the control circuits of each of the transfer mechanisms is a single pole double throw switch 86 which is operated by a cam 87 on crank shaft 43. Each of these switches comprises a normally closed contact 89 and a normally open contact 90, the closed contact being connected in the holding circuit of the associated motor controlling relay (77 or 78), while the normally open contact is included in the operating circuit of the associated transfer motor 44. The cam 87 is designed to open switch contact 89 and close switch contact 90 at the beginning of each operating cycle of the associate transfer mechanism. Contact 89 is held open and contact 90 is held closed by the cam until the completion of the operating cycle, whereupon a notch 92 in the cam allows contact 89 to close and contact 90 to open, as will be apparent from an inspection of Fig. 4.

Associated with each of the carrier operated switches 62 and 63 is a solenoid operated stop 94 which is adapted to cooperate with an arm 95 on rock shaft 65 to prevent counter-clockwise rotation of this shaft. Each of the stops 94 is operated by a slow releasing solenoid 97 under the control of a normally open anti-colliding switch 98. These switches are mounted along the main conveyer belt 21, one in advance of each of the work discharging conveyers 14, and are adapted to be closed by work carriers moving along the main conveyer. Thus, when a work carrier on the main conveyer approaches any one of the work discharging conveyers, it closes the associated anti-colliding switch 98, and thereby actuates the associated solenoid operated stop 94 to lock shaft 65 against counter-clockwise rotation (Figs. 1 and 4). Arm 67 is thus prevented from turning so that it serves to stop any outgoing work carrier on the associated work discharging conveyer which at the time may be approaching the main conveyer. This prevents collisions between work carriers at the junctions between the main conveyer and the work discharging conveyers.

The anti-colliding switches 98 are placed a sufficient distance in advance of the associated work discharging conveyers 14 so that in the event that an outgoing work carrier on any one of the work discharging conveyers is approaching the main conveyer, after having closed switch 62 or switch 63, at the time that the associated anti-colliding switch is operated by a work carrier on the main conveyer, the outgoing carrier will have sufficient time to move onto the main conveyer in front of the carrier on the main conveyer without any collision between the carriers. The slow releasing stop operating solenoids insure that the stop arms 67 will remain effective for stopping outgoing work carriers on the work discharging conveyers for a sufficient period of time after the release of the associated anti-colliding switches to allow the work carriers on the main conveyer to reach a point beyond the discharge end of the associated work discharging conveyer and thus avoid collisions.

Stationary deflectors 100, 100 are mounted above the main conveyer, one adjacent each work receiving conveyer 12. These deflectors cooperate with the pilot pins 32 placed on the work carriers to selectively divert the work carriers from the main conveyer onto the receiving conveyers 12. It will be noted that the deflectors are mounted at different positions transversely of the main conveyer belt so that they are effective for diverting only those carriers having correspondingly positioned pilot pins.

In the operation of the conveyer system, each of the work tables is started with a certain number of work supporting carriers thereon and, thereafter, each time a carrier leaves work table 10 it closes switch 62, while each carrier that leaves work table 11 closes switch 63. With selector switch 74 in the position shown in Fig. 4, the closing of switch 62 by an outgoing carrier completes an energizing circuit for relay 78 through a battery 102. The relay therefore operates and through its contacts 80 it immediately establishes a holding circuit through normally closed contact 89 of cam operated switch 86. The relay also establishes through its contacts 81 a starting circuit for the transfer motor 44, providing that the anti-colliding switches 84 are closed. This starts the transfer motor by means of which the transfer mechanism at storage unit 23 is operated to transfer a work carrier from the storage chute onto the transfer conveyer belt 36. At the beginning of the operation of the transfer mechanism, cam 87 opens cam switch contact 89 and closes cam switch contact 90. The opening of contact 89 de-energizes relay 78, whereupon its contacts open, thus breaking the starting circuit of the transfer motor. However, the simultaneous closing of cam switch contact 90 connects the transfer motor direct to battery 102, and since cam 87 holds cam switch contact 90 closed until crank 43 makes one complete revolution, the supply of operating current to the transfer motor is maintained until the completion of the operating cycle of the transfer mechanism. In other words, after an operating cycle of the transfer motor has been started, the subsequent opening of anti-colliding switches 84 and/or relay contacts 81 does not interrupt the operation of the transfer motor. Upon the completion of the operating cycle, cam 87 causes switch contact 90 to open and switch contact 89 to close. As a result, the transfer motor stops unless switch 62 happens to be closed when cam switch contact 89 is closed, in which event, the transfer motor repeats its operating cycle, providing, of course, that the anti-colliding switches 84 are also closed at that time.

In the event that one of the anti-colliding switches 84 is open at any time that switch 62 is closed by an outgoing work carrier, relay 78 operates in the usual manner and remains energized through its holding contacts 80, but the transfer motor does not start until both anti-colliding switches are closed so as to establish a starting circuit for the transfer motor. In such instances, the relay 78, in effect, stores the call for a work carrier until the transfer conveyer is free to receive a work carrier from the storage unit, at which time both anti-colliding switches 84 will be closed.

It will be understood that when work table 10 is to be supplied with work from storage unit 23, the selector switch 74 should be in the position shown in Fig. 4, and the pilot pins 32 should be properly positioned on the work carriers at storage unit 23 so that they will cooperate with the deflector 100 adjacent work table 10 to divert the work carriers onto the receiving conveyer 12 of that work table.

In order to supply work table 10 with work from storage unit 22, selector switch 74 should be positioned to connect relay 77 with switch 62 and the pilot pins should be positioned on the work carriers at storage unit 22 so that they will cooperate with the deflector adjacent work table 10 to divert the work carriers onto the receiving conveyer of that work table. When selector switch 74 is positioned to supply work from storage unit 22 to work table 10, the closing of switch 62 establishes an energizing circuit for relay 77 through a battery 103, which results in the operation of the transfer mechanism at storage unit 22 in the same manner as described above in connection with storage unit 23. The anti-colliding switch 83 opposite storage unit 22 serves to delay the operation of the transfer mechanism until the transfer conveyer is free to receive a work carrier.

In the same manner as described above in connection with work table 10, each work carrier leaving work table 11 closes the switch 63 and thus causes another work carrier to be supplied to the work table from a pre-selected one of the storage units in accordance with the position of selector switch 75. Thus, a predetermined number of work carriers is constantly maintained at each work table, it being necessary only to maintain a supply of work carriers at each of the storage units.

The operators positioned along the work tables 10 and 11 remove the incoming work carriers from the work receiving conveyers 12 and, after the work thereon has been completed, the operators remove the pilot pins from the work carriers and then place them on the work discharging conveyers 14 which deliver the work carriers onto the main conveyer 20, as described above. The main conveyer conveys the completed work to the desired destination. The anti-colliding switches 98 on the main conveyer prevent collisions between work carriers at the junctions between the main conveyer and the work discharging conveyers in the manner hereinbefore described.

Although a specific embodiment of the invention is illustrated and described herein, it should be understood that modifications may be made wtihout departing from the invention.

What is claimed is:

1. In a conveyer system, a plurality of article handling stations, a conveyer for conveying articles to said stations, a plurality of article storage units adjacent to said conveyer, and means actuated by articles leaving said stations for selectively actuating said storage units to release articles therefrom for delivery to said stations.

2. In a conveyer system, a plurality of article handling stations, a conveyer for conveying articles to said stations, a plurality of article storage units laterally adjacent to said conveyer, a separate transfer means for each storage unit for transferring articles therefrom to said conveyer, means for conveying articles away from said stations, and means actuated by articles leaving said stations for selectively actuating the transfer means at pre-selected ones of said storage units.

3. In a conveyer system, a main conveyer, branch conveyers for conveying articles to and from said main conveyer, a plurality of work stations adjacent to said branch conveyers, a plurality of article storage units adjacent to said main conveyer, and means adjacent to the branch conveyers and actuated by articles leaving said stations for transferring articles selectively from pre-selected ones of said storage units to said main conveyer for delivery to said stations.

4. In a conveyer system, an article handling station, a conveyer for conveying articles to and from said station, an article storage unit adjacent to said conveyer, a transfer mechanism for transferring articles from said storage unit to said conveyer, an electric motor for operating said transfer mechanism, a starting circuit for said motor, a relay for controlling said circuit, an energizing circuit for said relay including a normally open switch adapted to be closed momentarily by articles leaving said station, and a holding circuit for said relay under the control of said motor.

5. In a conveyer system, an article handling station, a conveyer for conveying articles to and from said station, an article storage unit adjacent to said conveyer, a transfer mechanism for transferring articles from said storage unit to said conveyer for delivery to said station, an electric operating motor for said transfer mechanism, a starting circuit for said motor including a normally closed anti-colliding switch adapted to be opened by articles on the conveyer adjacent the transfer mechanism, a relay for controlling the motor starting circuit, an energizing circuit for said relay including a normally open switch adapted to be closed by articles leaving said station, a holding circuit for said relay under the control of said motor, and a holding circuit for said motor under the control of said motor.

6. In a conveyer system, an article handling station, a conveyer for conveying articles to and from said station, article storage means laterally adjacent to said conveyer, means actuated by articles leaving said station for transferring articles from said storage means to said conveyer for delivery to said station, means under the control of articles on said conveyer for controlling said transfer means, and additional means under the control of articles on said conveyer for controlling the movement of articles from said station.

7. In a conveyer system, a main conveyer, a plurality of work stations laterally adjacent to said main conveyer, a series of work receiving conveyers for receiving work carriers from said main conveyer for delivery to said stations, a series of work discharging conveyers for receiving work carriers from said stations for delivery to said main conveyer, a plurality of work storage stations adjacent to said main conveyer, and means actuated by work carriers leaving said work stations on said work discharging conveyers for transferring work carriers selectively from said storage stations to said main conveyer for delivery to said work stations.

8. In a conveyer system, a plurality of article handling stations, means for conveying articles to said stations, a plurality of article storage units for supplying articles to said conveying means for delivery to said stations, a separate transfer mechanism for each storage unit for transferring articles therefrom to said conveying means, means for conveying articles away from said stations, and means actuated by articles leaving said stations for selectively actuating said transfer mechanisms.

9. In a conveyer system, a plurality of article handling stations, a conveyer for conveying articles to said stations, means for selectively diverting articles from said conveyer to said stations, a plurality of article storage units for supplying articles to said conveyer for delivery to said stations, a separate transfer mechanism for each storage unit for transferring articles from the respective storage units to said conveyer, means for conveying articles away from said stations, and a separate means at each station adapted to be operated by articles leaving the respective stations for selectively operating said transfer mechanisms.

10. In a conveyer system, a main conveyer, branch conveyers for conveying articles to and from said main conveyer, a plurality of work stations adjacent to said branch conveyers, a plurality of article storage units for supplying articles to said main conveyer for delivery to said work stations, a transfer mechanism for each article storage unit for transferring articles from the respective storage units to said main conveyer, and a plurality of control elements adapted to be selectively actuated by articles leaving said stations for selectively controlling the operation of said transfer mechanisms.

EZRA J. BEAULIEU.
LOREN E. BENNETT.
PAUL S. McCANN.